United States Patent
Orr

(10) Patent No.: US 6,457,027 B1
(45) Date of Patent: Sep. 24, 2002

(54) METHOD AND APPARATUS FOR GENERATING A MULTIMEDIA DOCUMENT

(75) Inventor: Stephen Jonathan Orr, East York (CA)

(73) Assignee: ATI Technologies, Inc., Thornhill (CA)

( * ) Notice: Subject to any disclaimer, the term of this patent is extended or adjusted under 35 U.S.C. 154(b) by 0 days.

(21) Appl. No.: 08/831,079

(22) Filed: Apr. 1, 1997

(51) Int. Cl.[7] .......................... G06F 15/00; G06F 17/30
(52) U.S. Cl. .................. 707/513; 707/104.1; 707/500; 707/102
(58) Field of Search .................. 707/500, 513, 707/900, 501, 514, 523, 501.1, 500.1, 104.1, 102; 345/302; 382/207

(56) References Cited

U.S. PATENT DOCUMENTS

| | | | | |
|---|---|---|---|---|
| 5,420,974 A | * | 5/1995 | Morris et al. ............... | 707/515 |
| 5,642,171 A | * | 6/1997 | Baumgartner et al. ...... | 348/515 |
| 5,655,117 A | * | 8/1997 | Goldberg et al. ........... | 707/102 |
| 5,664,226 A | * | 9/1997 | Czako et al. ............... | 395/872 |
| 5,742,283 A | * | 4/1998 | Kim ........................... | 345/302 |
| 5,752,029 A | * | 5/1998 | Wissner ...................... | 707/104 |
| 5,754,766 A | * | 5/1998 | Shaw et al. ............... | 395/200.3 |
| 5,767,846 A | * | 6/1998 | Nakamura et al. .......... | 345/302 |
| 5,861,880 A | * | 1/1999 | Shimizu et al. ............. | 345/302 |
| 5,864,870 A | * | 1/1999 | Guck .......................... | 707/104 |
| 5,873,080 A | * | 2/1999 | Coden et al. ................ | 707/3 |
| 5,875,448 A | * | 2/1999 | Boys et al. ................. | 707/531 |
| 5,892,966 A | * | 4/1999 | Petrick et al. ............... | 707/104 |
| 5,903,892 A | * | 5/1999 | Hoffert et al. ................ | 707/10 |
| 5,918,223 A | * | 6/1999 | Blum et al. ..................... | 707/1 |
| 5,949,410 A | * | 9/1999 | Fung ........................... | 345/302 |

OTHER PUBLICATIONS

Cox et al., Scanning the technology On the Applications of Multimedia Process. to Communications, IEEE vol. 86 No. 5.*

* cited by examiner

*Primary Examiner*—Greta L. Robinson
(74) *Attorney, Agent, or Firm*—Vedder, PRice, Kaufman & Kammholz

(57) ABSTRACT

A method and apparatus for generating a multimedia document that includes video image samples and associated audio is accomplished by decoding video signals into decoded video representations, sampling the decoded video representations at a rate below the motion video frame rate, and storing the video samples as a video document. For example, a JPEG document. In addition to creating video documents, the present method and apparatus also digitizes received audio signals and stores the digitized audio as an audio document. For example, as an AIFF (audio interchange file format audio format audio document, a WAV (which is used with Windows™) audio document, or a RealAudio™ (which is the Internet standard for delivering continuous audio) audio document. Once the video document(s) and audio document(s) are created, they are mapped together and stored as a multimedia document, which may be a hypertext document, such as an HTML document.

18 Claims, 5 Drawing Sheets

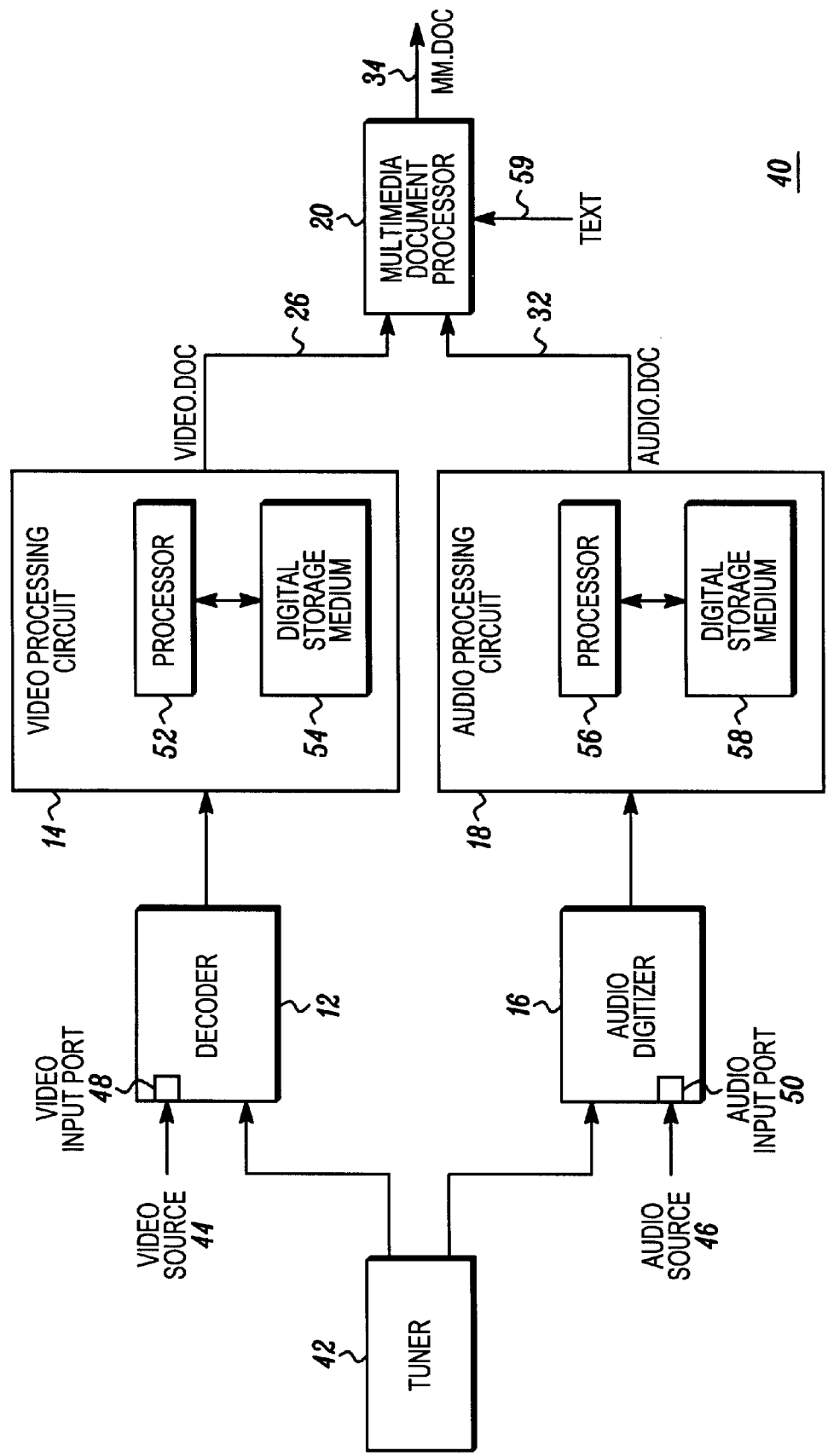

METHOD AND APPARATUS FOR GENERATING A MULTIMEDIA DOCUMENT

TECHNICAL FIELD OF THE INVENTION

This invention relates generally to audio and video processing and more particularly to a method and apparatus for generating a multimedia document from a variety of audio and video sources.

BACKGROUND OF THE INVENTION

As computer technology advances, it provides the public and private sectors with an ever-increasing array of services, data resources, and programming options. For example, computers may now be equipped with a television tuner such that it is capable of receiving broadcast television. The television tuner may be an external device, or part of a printed circuit board (PCB) that is installed in the computer. One such television tuner board is the All-In-Wonder manufactured by ATI Technologies, Inc.

The television tuner, upon receiving a television broadcast, provides the received signals to a decoder which converts the received signals into digital video data. Once in the digital domain, the computer can manipulate the video data. For example, if the television broadcast is also transmitted with closed caption text, the computer can produce a computerized TV magazine. In essence, the TV magazine consists of a plurality of still video images sampled from the video data accompanied by the closed caption text. Thus, if a user misses the live broadcast of a television program which includes closed caption text, the user has the option of having his or her computer record the television program as a TV magazine.

While the TV magazine provides a computer user more flexibility in viewing television programs, such programs must include the closed caption text. If the program does not include the closed caption text, only still images can be recorded. A further limitation of TV magazines arises due to the copyright nature of television programs. While the owner of a copyrighted work has the right to copy, display, distribute, etc., a private user does not have such rights without expressed written consent. Thus, if a private user desired to place a TV magazine on his or her web page, that person would most likely be violating the rights of the copyright owner. Of course, the copyright owner may place the copyrighted TV magazine on its web page without such an issue, but controlling copying of the TV magazine would be very difficult.

In addition to receiving television broadcasts, a video decoder such as the one on the All-in-Wonder board is capable of receiving video images from other sources such as video cassette recorders, digital video disc players, video cameras, etc. If a user desired to make a TV magazine of a personally recorded event, such as a vacation, the user would have to enter in the associated text. Such a process, while producing the TV magazine, requires a considerable amount of work.

Therefore, a need exists for a method and/or apparatus that allows a user to conveniently produce a multimedia document without the above mentioned complications of having to generate the associated text and potential legal issues of TV magazines.

BRIEF DESCRIPTION OF THE DRAWINGS

FIG. 2 illustrates a schematic block diagram of an alternate circuit for generating multimedia documents in accordance with the present invention;

DETAILED DESCRIPTION OF THE DRAWINGS

Generally, the present invention provides a method and apparatus for generating a multimedia document that includes video image samples and associated audio. This is accomplished by decoding video signals into decoded video representations, sampling the decoded video representations at a rate below the motion video frame rate, and storing the video samples as a video document. For example, as a JPEG (Joint picture expert group) document. In addition to creating video documents, the present method and apparatus also digitizes received audio signals and stores the digitized audio as an audio document. For example, as an AIFF (audio interchange file format audio format which is used with MAC OS™) audio document, a WAV (which is used with Windows™) audio document, or a RealAudio™ (which is the Internet standard for delivering continuous audio) audio document. Once the video document(s) and audio document(s) are created, they are mapped together and stored as a multimedia document, which may be a hypertext document. With such a method and apparatus, a user can readily create a multimedia document from video and audio received from a video cassette recorder, a digital video disc player, a video camera, or broadcast video, and provide it on his or her web page or distribute it in any digitally formatted manner he or she chooses.

Figure 1:
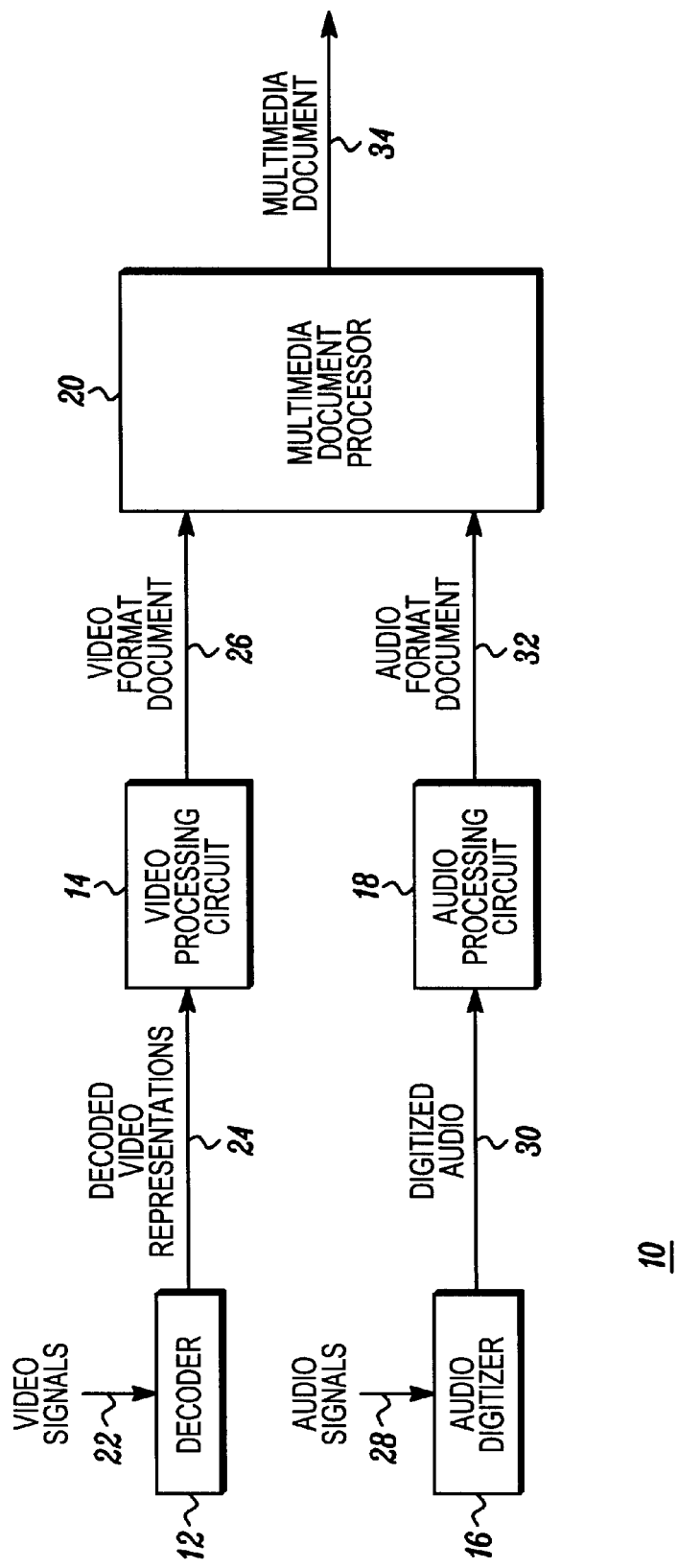
FIG. 1 illustrates a schematic block diagram of a circuit for generating multimedia documents in accordance with the present invention.

The present invention can be more fully described with reference to FIGS. 1–7. FIG. 1 illustrates a schematic block diagram of a circuit 10 for generating multimedia documents. The circuit 10 includes a decoder 12, a video processing circuit 14, an audio digitizer 16, an audio processing circuit 18, and a multimedia document processor 20. The decoder 12, which may be Brooktree BT 829 decoder, receives video signals 22 from any one of a variety of video sources, such as broadcast television, cable television, satellite television, a video cassette recorder, a laser disc player, a digital video disc player, or a video camera. Upon receiving the video signals 22, the decoder 12 decodes them into the digital domain and provides them as decoded video representations 24 to the video processing circuit 14.

The video processing circuit 14 samples the decoded video representations 24 at a rate below the motion video rate and processes the sampled representations to produce pixel information for the video image samples. The rate at which the video processing circuit 14 samples the video representations 24 is dependent upon user preferences, the subject matter of the video, the length of the video, and the desired memory size. For example, if the subject matter is a 15 minute video cassette recording of a user's vacation with the user's narrative and the user would like to store the recording on a 3.5 inch disk, the video sampling rate could be every 5 to 10 seconds accompanied by the associated audio and would require about 1 Mb of memory. Alternatively, if the user desired to distribute his or her video on his or her web page, the video sampling rate could be more or less often.

The pixel information is then stored as a video document which can be a JPEG document. Typically, the JPEG document will be selected to give the best image quality. As one skilled in the art will readily appreciate, the image quality of JPEG can vary depending on the desired visual effects by changing the compression rate. The video formatted document 26 is then provided to the multimedia document processor 20.

While the video signals are being processed as just described, audio signals 28 are also being processed. As the audio signals 28 are received by the audio digitizer 16, they are digitized producing digitized audio 30. The audio processing circuit 18, which may be a sound card resident within a computer, receives the digitized audio 30 and produces, therefrom, an audio formatted document 32. The audio formatted document 32 may be an AIFF document, a WAV document, or a RealAudio™ document. The resulting audio formatted document 32 is subsequently provided to the multimedia document processor 20.

The multimedia document processor 20, which may be a stand-alone device comprising a processor and associated software for generating a hypertext document, may be a software application performed by the central processing unit of the computer, or it may be a combination thereof, receives the video format document 26 and the audio format document 32. Upon receiving these documents 26 and 32, the multimedia document processor 20 maps them together to produce a multimedia document 34. In essence, the mapping is a processing of linking the video document with the corresponding audio document, such that when the multimedia document is displayed, the still images of the video have the appropriate full audio associated therewith.

FIG. 2 illustrates a schematic block diagram of an alternate circuit 40 for generating multimedia documents 34. The circuit 40 includes a tuner 42, the decoder 12, the video processing circuit 14, the audio digitizer 16, the audio processing circuit 18, and the multimedia document processor 20. The decoder 12 is shown to further comprise a video input port 48. As such, the decoder 12 is coupled to receive video signals from the tuner 42 or from a video source 44 which may be cable television, satellite television, a video cassette recorder, a laser disc player, a digital video disc player, or a video camera. The decoder 12 decodes the received video signals and provides them to the video processing circuit 14.

The video processing circuit 14 is shown to further comprise a processor 52 and a digital storage medium 54. The processor 52 may be a stand-alone processor, it may be the central processing unit of the computer, or it may be a combination thereof. The digital storage medium 54, which may be RAM, ROM, or part of the computer's system is memory, stores programming instructions that, when read by the processor 52, causes the processor 52 to sample the received decoded video representations and to convert the video samples into a video document, such JPEG. The resulting video document is provided to the multimedia document processor 20.

While the video document is being created, an audio document is also being created. The audio document is created as the audio digitizer 16, which further comprises an audio input port 50, receives audio signals. As shown, the audio digitizer 16 is coupled to receive audio signals from the tuner 42 or from an audio source 46 which may be cable television, satellite television, a video cassette recorder, a laser disc player, a digital video disc player, or a video camera. As the audio digitizer 16 receives the audio signals, it digitizes them and provides the digitized version to the audio processing circuit 18.

The audio processing circuit 18 is shown to further comprise a processor 56 and a digital storage medium 58. The processor 56 may be a stand-alone processor, it may be the central processing unit of the computer, or it may be a combination thereof The digital storage medium 58, which may be RAM, ROM, or part of the computer's system memory, stores programming instructions that, when read by the processor 56, causes the processor 56 to convert the digitized audio into an audio document, such as AIF, WAV, or RealAudio™. The resulting audio document is provided to the multimedia document processor 20.

The multimedia document processor 20, which may be a stand-alone device comprising a processor and associated software for generating a hypertext document, may be a software application performed by the central processing unit of the computer, or it may be a combination thereof, receives the video format document 26 and the audio format document 32. Upon receiving these documents 26 and 32, the multimedia document processor 20 maps them together to produce a multimedia document 34. In essence, the mapping is a processing of linking the video document with the corresponding audio document, such that when the multimedia document is displayed, the still images of the video have the appropriate full audio associated therewith.

In addition, the multimedia document processor 34 may also receive a text document 59. The text document 59 may be closed caption text from a television broadcast, or user created text, such as annotations. When text documents 59 are also received, the multimedia document processor 20 maps the audio, video, and text documents together to produce the multimedia document 34.

Figure 3A:
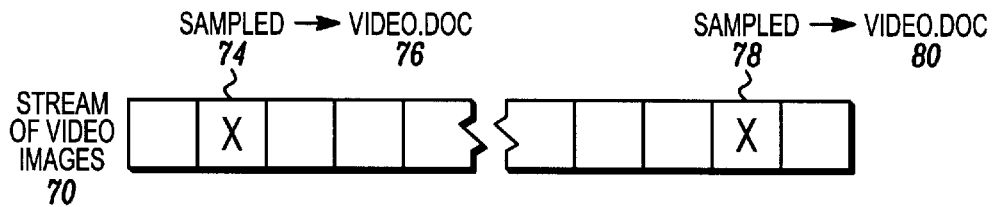
FIG. 3 illustrates an example of generating multimedia document elements in accordance with the present invention.
Figure 3B:
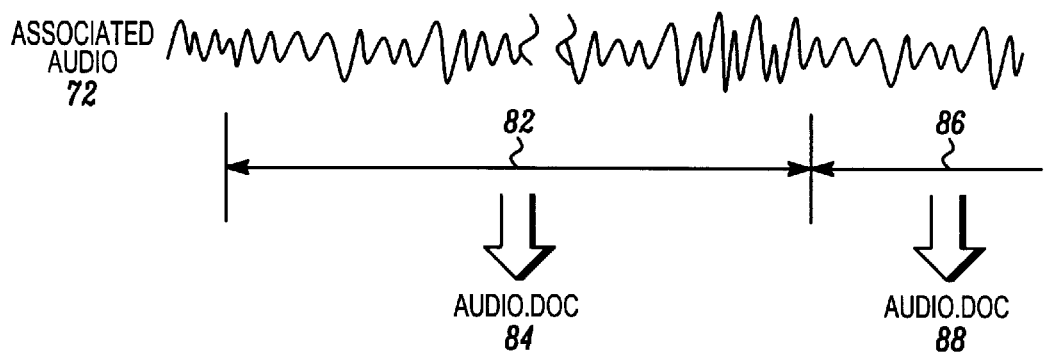

FIG. 3 illustrates an example of generating multimedia document elements, i.e., the video document and the audio document. As shown, a stream of video images 70, which may be sourced by broadcast television, cable television, satellite television, a video cassette recorder, a laser disc player, a digital video disc player, or a video camera, includes a plurality of images. At some sampling rate, which is below the motion video rate, a video image is sampled 74 and 78. The sampled video images 74 and 78 are then converted into video documents 76 and 80 as described above.

The example further shows an audio waveform of the associated audio 72 accompanying the stream of video images 70. The associated audio 72 is synchronous with the stream of images 70, such that, if the original video were played, the video and audio would be in sync, i.e., as a person's lips moved, the movements would be appropriate for the audio being played. The associated audio 72 is then digitized into digitized audio segments 82 and 86. Each audio segment 82 and 86 is associated with a sampled video image. In this example, audio segment 82 is associated with video sample 74 and audio segment 86 is associated with video sample 78. The digitized audio segments 82 and 86 are subsequently converted into audio documents 84 and 88.

Figure 4:
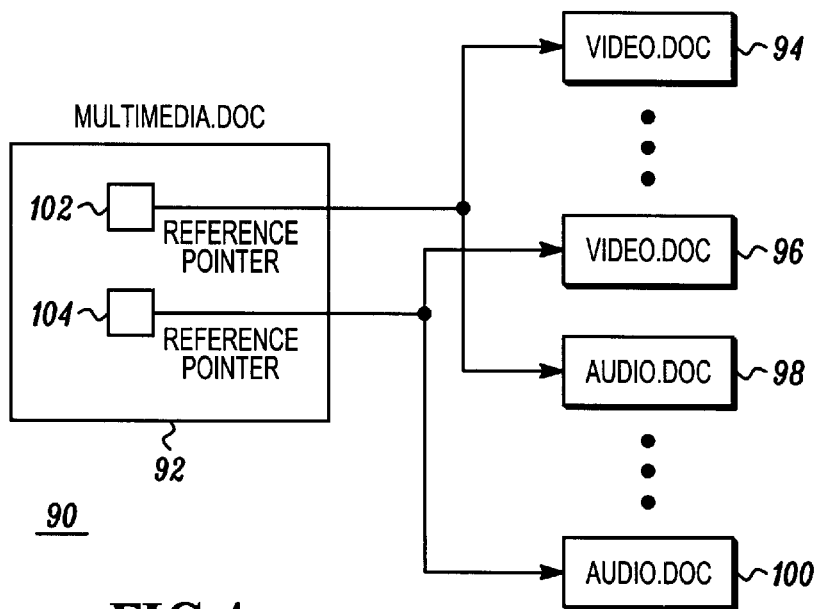
FIG. 4 illustrates an example of a multimedia document in accordance with the present invention.

FIG. 4 illustrates an example of a multimedia document 92 which includes a plurality of reference pointers 102 and 104. Each of the reference pointers 102 and 104 points to at least one video document and at least one audio document. In the illustration presented, reference pointer 102 points to video document 94 and audio document 98, while reference pointer 104 points to video document 96 and audio document 100. The pointing to video and audio documents provides the mapping as previously discussed. As one skilled in the art will readily appreciate, the multimedia document 92 may further include text and may be a hypertext document such as HTML.

Figure 5:
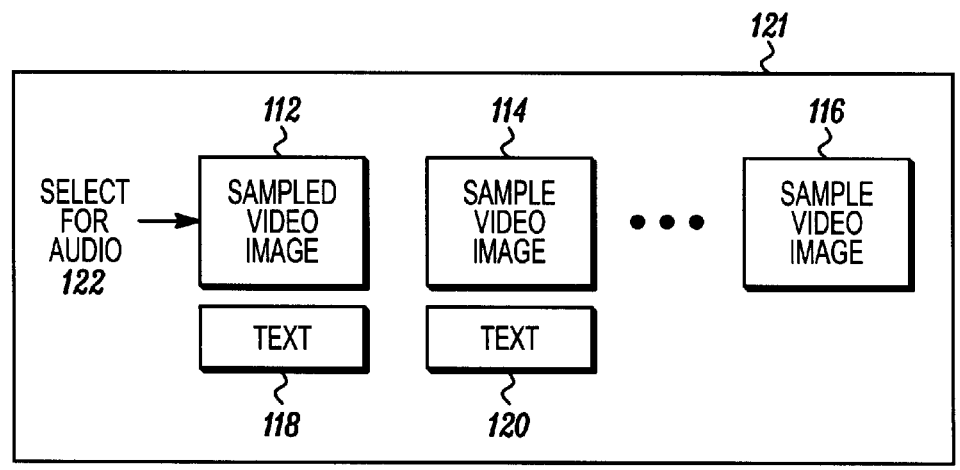
FIG. 5 illustrates a block diagram of an example layout of a multimedia document in accordance with the present invention.

FIG. 5 illustrates a block diagram of an example layout of a multimedia document. As shown, a plurality of sampled video images 112, 114, and 116 are displayed on a computer screen 121 when the multimedia document is accessed. Also shown are text icons 118 and 120 which are associated with sampled video images 112 and 114. When the viewer desires to listen to the associated audio of a particular sampled video image 112, 114, and 116, the user selects 122 the image by any user interface means, whether graphical or keyboard. In one embodiment, the selection 122 of audio would be done by a point and click operation of a mouse controlled cursor. Alternatively, if the user desires to read the associated text, the user selects one of the text icons 118 and 120.

Figure 6:
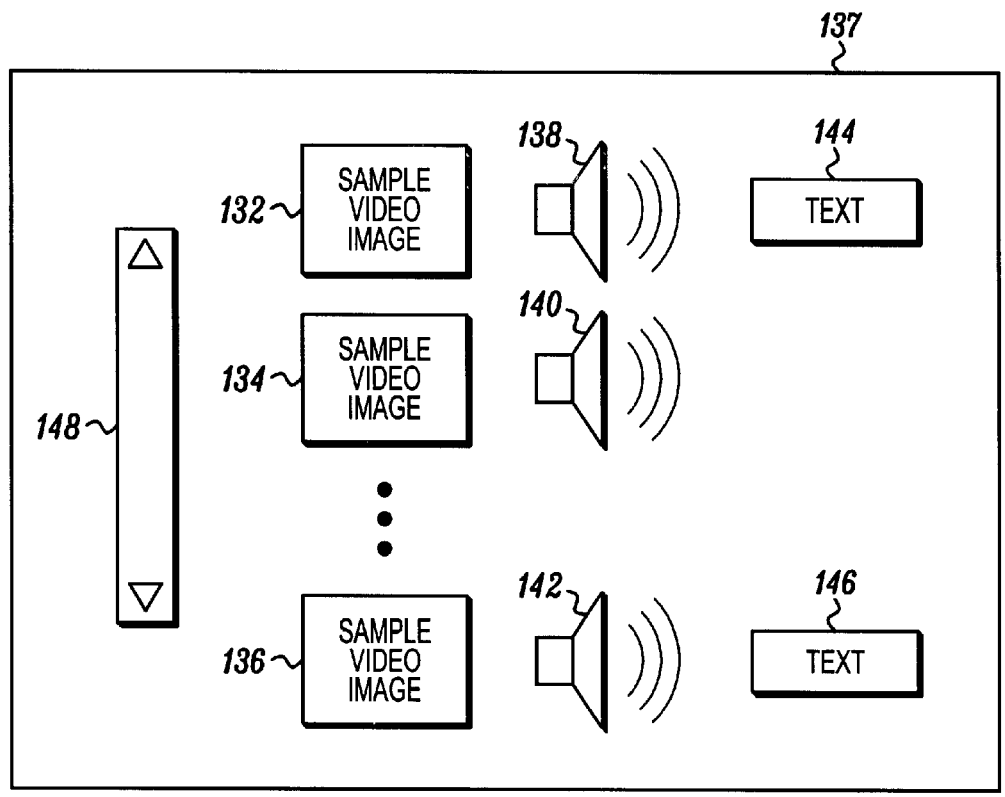
FIG. 6 illustrates a block diagram of an alternate example layout of a multimedia document in accordance with the present invention.

FIG. 6 illustrates a block diagram of an alternate example layout of a multimedia document. As shown, a plurality of sampled video images 132, 134, and 136 are displayed on a computer screen 137 when the multimedia document is accessed. Also shown is a plurality of audio icons 138, 140, and 142 and a plurality of text icons 144 and 146. Each of the plurality of audio icons 138, 140, and 142 are positioned near one of the sampled video images 132, 134, and 136. When the viewer desires to listen to the associated audio of a particular video image, the user selects the associated audio icon. Similarly, if the user desires to view the associated text, the user selects the associated text icon. A scroll bar 148 is further included to allow the user to scroll through the video images.

Figure 7:
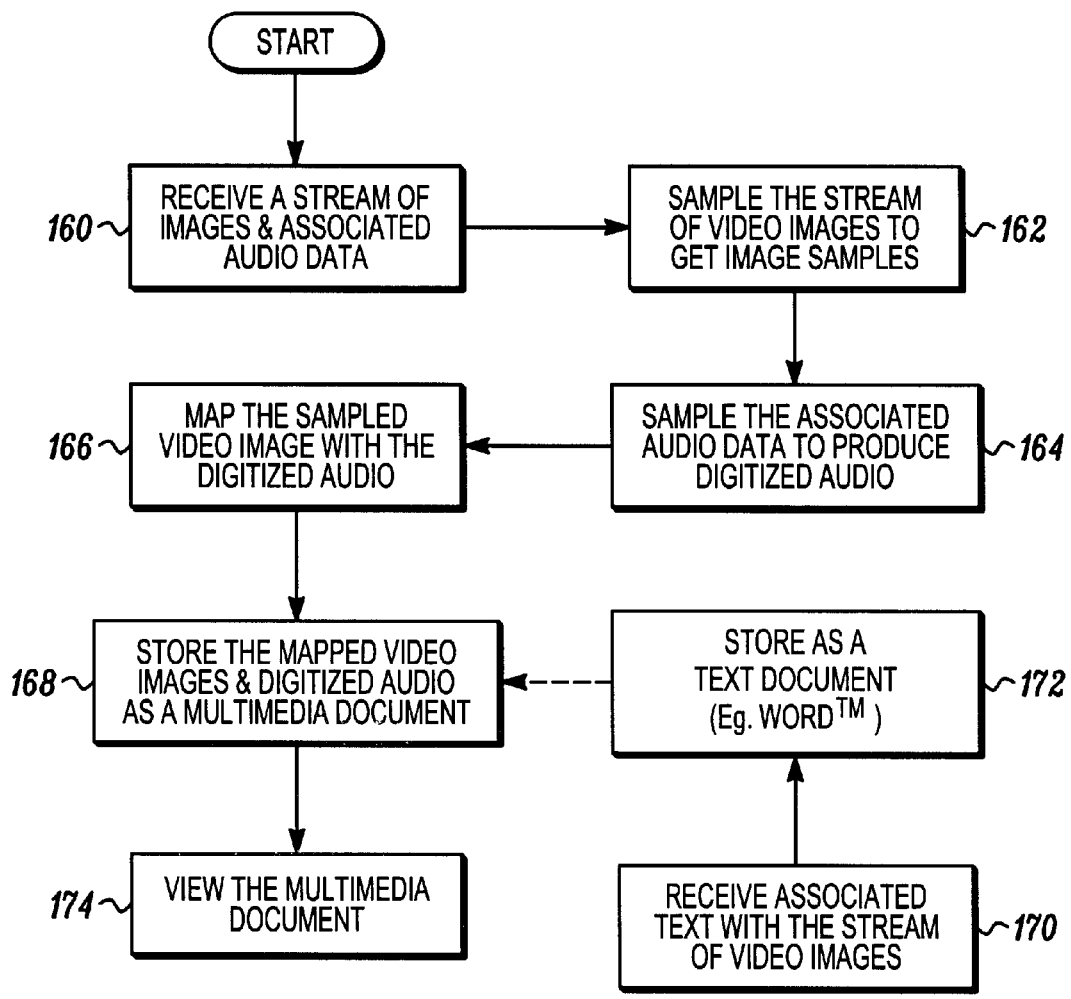
FIG. 7 illustrates a logic diagram that may be used to produce a multimedia document in accordance with the present invention.

FIG. 7 illustrates a logic diagram that may be used to produce a multimedia document. The process begins at step 160, where a stream of video images and associated audio are received. As previously mentioned, the source for the video and audio may be any one of broadcast television, cable television, satellite television, a video cassette recorder, a laser disc player, a digital video disc player, or a video camera. The process then proceeds to step 162, where the video images are sampled at a rate below the motion video rate of 12 frames per second. The sampling yields a plurality of sampled video images which are subsequently stored as video documents. The process proceeds to step 164, which is actually performed in parallel with step 162, where the associated audio is sampled to produce digitized audio.

The process then proceeds to step 166, where the video image samples and the digitized audio are mapped together. The details of mapping were discussed above with reference to FIGS. 1–4. The process then proceeds to step 168, where the mapped video images and the digitized audio are stored as a multimedia document. This step was also previously discussed with reference to FIGS. 1–4. The process then may proceed to step 170 if there is to be associated text in the multimedia document. At step 170 associated text is received with the stream of video images. As previously mentioned, the associated text may be closed caption text or user created text. The process then proceeds to step 172, where the associated text is stored in the hypertext document and is mapped to the video images in step 168. Finally, the process proceeds to step 174, where the multimedia document is viewed. Viewing of the multimedia document, which may have a layout as shown in FIGS. 5 and 6, can be done on a local computer, through a local web browser, as a publication on an intranet, or as a publication on the Internet such that multimedia document may be browsed via the world wide web.

The preceding discussion has described a method and apparatus for generating a multimedia document that includes video images and associated audio. The video images are sampled from any type of video source at a rate that is below the motion video rate. The sampled video images are then stored as video documents, such as a JPEG document. The associated audio is digitized and stored as an audio document. The video and audio documents are then mapped to produce the multimedia document which may be placed on a users web page for others to view.

What is claimed is:

1. A method for generating a multimedia document, the method comprising the steps of:
   a) receiving a stream of video images and associated audio data to be put in a form to generate the multimedia document;
   b) sampling the stream of video images to produce a plurality of sampled video images to be used to generate the multimedia document;
   c) sampling the associated audio data to produce digitized audio to be used to generate the multimedia document;
   d) mapping the plurality of sampled video images with the digitized audio to produce mapped video images and digitized audio; and
   e) storing the mapped video images and digitized audio as a multimedia document and storing the mapped video images and digitized audio as a hypertext document.

2. The method of claim 1 further comprises, within step (a), the stream of video images and the associated audio data is received from at least one of: a video cassette recorder, a video camera, a laser disc player, and broadcast video.

3. The method of claim 1 further comprises, within step (b), sampling the stream of video images at a predetermined frame rate or user defined frame rate, wherein the predetermined frame rate and the user defined frame rate are below a motion video frame rate.

4. The method of claim 1 further comprises, within step (d), mapping associated text with the mapped video images and digitized audio.

5. The method of claim 1 further comprises, within step (c), sampling the associated audio data using at least one of: an audio interchange file format audio format, WAV audio format, Real Audio™ audio format.

6. The method of claim 1 further comprises the step of viewing the multimedia document on at least one of: a local computer, through a local web browser, a publication on an intranet, or a publication on Internet for world wide web browsing.

7. The method of claim 1 further comprises, within step (e), storing the multimedia document as at least one of: a series of pictures with associated audio for each picture in the series of pictures, wherein the associated audio is activated by selecting the picture, and a series of video image icons and associated audio icons, wherein selection of an audio icon initiates a corresponding audio presentation.

8. The method of claim 1 further comprises storing the multimedia document to further include an associated text icon.

9. A method for generating a multimedia document, the method comprising the steps of:
   a) receiving a stream of video images and associated audio data to be put in a form to generate the multimedia document;
   b) sampling the stream of video images to produce a plurality of sampled video images to be used to generate the multimedia document;

c) sampling the associated audio data to produce digitized audio to be used to generate the multimedia document;

d) mapping the plurality of sampled video images with the digitized audio to produce mapped video images and digitized audio; and e) storing the video images of the mapped video images and digitized audio as a multimedia document, hypertext document, and as a hypertext markup language document.

10. A method for generating a multimedia document, the method comprising the steps of:

a) receiving a stream of video images and associated audio data to be put in a form to generate the multimedia document;

b) sampling the stream of video images to produce a plurality of sampled video images to be used to generate the multimedia document;

c) sampling the associated audio data to produce digitized audio to be used to generate the multimedia document;

d) mapping the plurality of sampled video images with the digitized audio to produce mapped video images and digitized audio; and e) storing the mapped video images and digitized audio as a multimedia document and including within the multimedia document a plurality of reference pointers, each of which points to at least one video document and at least one audio document.

11. A circuit for generating a multimedia document comprising:

a) a decoder operably coupled to receive video signals and to produce decoded video representations therefrom put in a form to generate the multimedia document;

b) an audio processing circuit operably coupled to receive audio signals and to produce digitized audio therefrom put in a form to generate the multimedia document;

c) an audio processing circuit operably coupled to receive the digitized audio and convert the digitized audio into an audio format document;

d) an video processing circuit operably coupled to receive the decoded video representations and to convert the decoded video representations into a video format document; and e) a multimedia document circuit operably coupled to reference the video format document and the audio format document to produce a multimedia document, the multimedia document circuit comprises:

a processor; and a digital storage medium, wherein the digital storage medium stores programming instructions that, when read by the processor, causes the processor to include a plurality of reference pointers within the multimedia document, each of which points to at least one video document and at least one audio document.

12. The circuit of claim 11 further comprises a tuner operably coupled to provide at least one of: the video signals and the audio signals.

13. The circuit of claim 11 further comprises a video input port within the decoder and an audio input port within the audio digitizer, wherein the video input port and the audio input port are operably coupled to receive the video and audio signals, respectively, from at least one of a video camera, a video cassette recorder, a laser disc player, and a digital video disc player.

14. The circuit of claim 11 further comprises, within the audio processing circuit, a processor and digital storage medium, wherein the digital storage medium stores programming instructions that, when read by the processor, causes the processor to convert the digitized audio into at least one of a WAV audio format document, an audio interchange file format document, and a RealAudio™ audio format document.

15. The circuit of claim 11 further comprises, within the video processing circuit, a processor and digital storage medium, wherein the digital storage medium stores programming instructions that, when read by the processor, causes the processor to convert the decoded video into a hypertext document.

16. A digital storage medium that stores programming instructions that, when read by a processor, causes the processor to generate a multimedia document, the digital storage medium comprises:

first means for storing programming instructions that, when read by the processor, causes the processor to sample a stream of video images to produce a plurality of sampled video images;

second means for storing programming instructions that, when read by the processor, causes the processor to sample associated audio data to produce digitized audio, wherein the associated audio data is associated with the stream of video images;

third means for storing programming instructions that, when read by the processor, causes the processor to map the plurality of sampled video images with the digitized audio to produce mapped video images and digitized audio; and fourth means for storing programming instructions that, when read by the processor causes the processor to store the mapped images and digitized audio as a multimedia document and that, when read by the processor causes the processor to include a plurality of reference pointers within the multimedia document, each of which points to at least one video document and at least one audio document.

17. A method for generating a multimedia document, the method comprising the steps of:

a) receiving a stream of video images, associated audio data, and associated text data to be put in a form to generate the multimedia document;

b) sampling the stream of video images to produce a plurality of sampled video images to be used to generate the multimedia document;

c) sampling the associated audio data to produce digitized audio to be used to generate the multimedia document;

d) mapping the plurality of sampled video images, the digitized audio, and the associated text together to produce mapped video images, digitized audio, and text; and e) storing the mapped video images, digitized audio, text, and a plurality of reference pointers as a multimedia document, wherein each reference pointer of the plurality of reference pointers points to at least one video document and at least one audio document.

18. The method of claim 17 further comprises, within step (a), receiving the associated text as one of: closed captioned and user generated.

* * * * *